(12) United States Patent
Witzel et al.

(10) Patent No.: US 7,349,097 B2
(45) Date of Patent: Mar. 25, 2008

(54) INTERFEROMETRIC DETERMINATION OF A TRANSFER FUNCTION OF A DEVICE UNDER TEST

(75) Inventors: Eckhart Witzel, Ismaning (DE); Thomas Jensen, Rorschach (CH)

(73) Assignee: Agilent Technologies Inc., Santa Clara, CA (US)

( * ) Notice: Subject to any disclaimer, the term of this patent is extended or adjusted under 35 U.S.C. 154(b) by 0 days.

(21) Appl. No.: 11/503,106

(22) Filed: Aug. 11, 2006

(65) Prior Publication Data

US 2006/0274318 A1  Dec. 7, 2006

(51) Int. Cl.
*G01B 9/02* (2006.01)

(52) U.S. Cl. ...................................... 356/477

(58) Field of Classification Search ............... 356/73.1, 356/477
See application file for complete search history.

(56) References Cited

U.S. PATENT DOCUMENTS

| 2003/0053068 A1 | 3/2003 | Szafraniec et al. |
| 2003/0053069 A1 | 3/2003 | Motamedi et al. |

FOREIGN PATENT DOCUMENTS

| EP | 1 286 150 | 7/2002 |
| JP | 2003/106944 | 9/2003 |

OTHER PUBLICATIONS

Kieckbusch et al, Fast and accurate charactorization of fiber Bragg gratings with high spatial and spectral resolution, Optical Fiber Communications Confrence, 2003, OFC 2003, Mar. 2003, pp. 379-381.*
A New Calculus for the Treatment of Optical Systems, Journal of the Optical Society of America, vol. 37, No. 2, Feb. 1947, R. Clark Jones, pp. 110-112.
Automated Measurement of Polarization Mode Dispersion Using Jones Matrix Eigenanalysis, IEEE Photonics Technology Letters, vol. 4, No. 9, Sep. 1992, B.L. Heffner, pp. 1066-1069.
Deterministic, Analytically Complete Measurement of Polarization-Dependent Transmission Through Optical Devices, IEEE Photonics Technology Letters, vol. 4, No. 5, May 1992, B.L. Heffner, pp. 451-454.
LiNbO3-based integrated optical network analyzer for vertical structure characterization on fibre Bragg grantings, IEEE Proceedings online No. 20030762, Feb. 22, 2003, S. Bhandare, et al, pp. 490-494.
International Search Report Dated Oct. 27, 2004.

* cited by examiner

*Primary Examiner*—Samuel A. Turner (57) ABSTRACT

A method of evaluating a device under test (DUT) includes detecting four interferograms of the DUT including two orthogonal detections and two orthogonal input polarizations, performing a Hilbert transformation to obtain transfer functions of the DUT on the basis of the detected interferograms, performing an Inverse Fourier transformation on the transfer functions of the DUT to get an impulse response matrix IR of the DUT, and determining impulse response eigenvalues of the DUT on the basis of the impulse response matrix of the DUT.

5 Claims, 9 Drawing Sheets

$$h_1(\omega) = amp_1(\omega) \cdot e^{i\varphi_1(\omega)}$$
$$h_2(\omega) = amp_2(\omega) \cdot e^{i\varphi_2(\omega)}$$

Fig. 9

$$IR(t) = \begin{pmatrix} ir_{0,0}(t) & ir_{0,1}(t) \\ ir_{1,0}(t) & ir_{1,1}(t) \end{pmatrix}$$

Fig. 10a

$$IR^{T^*} IR \cdot \vec{v}_{ir} = ev_{ir} \cdot \vec{v}_{ir}$$
$$\det\left(IR^{T^*} IR - ev_{ir} \cdot E\right) = 0$$

Fig. 10b

$$ir_{new\,1/2}(t) = \sqrt{ev_{ir\,1/2}(t)}$$

Fig. 10c

$$P_{i,j}(\omega) = E_{LO}^2(\omega) + E_{dut\,i,j}^2(\omega) + 2\,E_{LO}(\omega)\,E_{dut\,i,j}(\omega) \cdot \cos\varphi_{i,j}(\omega)$$
$$= E_{LO}^2(\omega) + E_{dut\,i,j}^2(\omega) + E_{LO}(\omega)\,E_{dut\,i,j}(\omega) \cdot \left(e^{i\varphi_{i,j}(\omega)} + e^{-i\varphi_{i,j}(\omega)}\right)$$

Fig. 11a

$$h_{i,j}(\omega) = E_{dut\,i,j}(\omega) \cdot e^{i\,\varphi_{i,j}(\omega)}$$
$$H = \begin{pmatrix} h_{0,0} & h_{0,1} \\ h_{1,0} & h_{1,1} \end{pmatrix}$$

Fig. 11b

INTERFEROMETRIC DETERMINATION OF A TRANSFER FUNCTION OF A DEVICE UNDER TEST

This application claims priority under 35 U.S.C. § 119 to PCT/EP04/50212, filed on 26 Feb. 2004.

BACKGROUND OF THE INVENTION

The present invention relates to an interferometric determination of a transfer function of a device under test (DUT), in particular to an interferometric determination of a transfer function of a DUT to evaluate an impulse response of the DUT.

Figure 8:
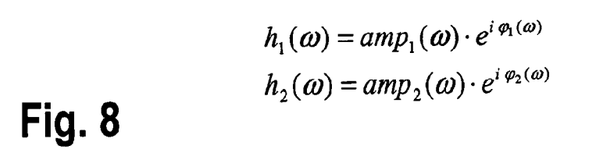
FIGS. 8, 9, 10a, 10b, 10c, 11a and 11b show several equations used in the description.

A standard routine of the prior art when determining a transfer function of a DUT was published by Heffner, B. L. in "Automated measurement of polarization mode dispersion using Jones matrix eigenanalysis", IEEE Photonics Technology Letters, 1992, 4, p. 1066-1069, and in "Deterministic, analytically complete measurement of polarization dependent transmission through optical devices", IEEE Photonics Technology Letters, 1992, 4, p. 451-454. The routine applies the so called "Jones algorithm" published by Jones, R. C. in "A new calculus for the treatment of optical systems, VI: Experimental determination of the matrix", Journal of Optical Society of America, 1947, 37, p. 110-112, to calculate amplitude and group delay eigenvalues of the DUT and from these determines the two eigenvalue transfer functions $h_1(\omega)$ and $h_2(\omega)$ of the DUT according to the equations of FIG. 8, with $amp_1$ and $amp_2$ being the amplitude eigenvalues, $\omega$ being the optical frequency and $\phi_1$ and $\phi_2$ being the phase eigenvalues. Knowledge of the two eigenvalue transfer functions $h_1$ and $h_2$ allows the calculation of the impulse response eigenvalues for the two eigenstates. This procedure works well for a DUT consisting of a single response.

However, the interferometric determination of a transfer function for calculation of an impulse response of a DUT is complicated, if the DUT consists of multiple transfer function elements, either due to reflective parts at different locations when performing reflectometry or due to a propagation splitting with different path lengths when performing transmission. In case of multiple transfer function elements one gets multiple responses. For these multiple responses the above algorithm falls, because in the optical frequency domain these responses are not separable any more and the computation of a single eigenvalue pair as a function of λ (or ω) makes no sense and the output becomes chaotic (see e.g. FIGS. 2 and 3). Multiple responses overlapping in the optical frequency domain can not be represented by a single eigenvalue pair in the optical frequency domain.

Figure 1:
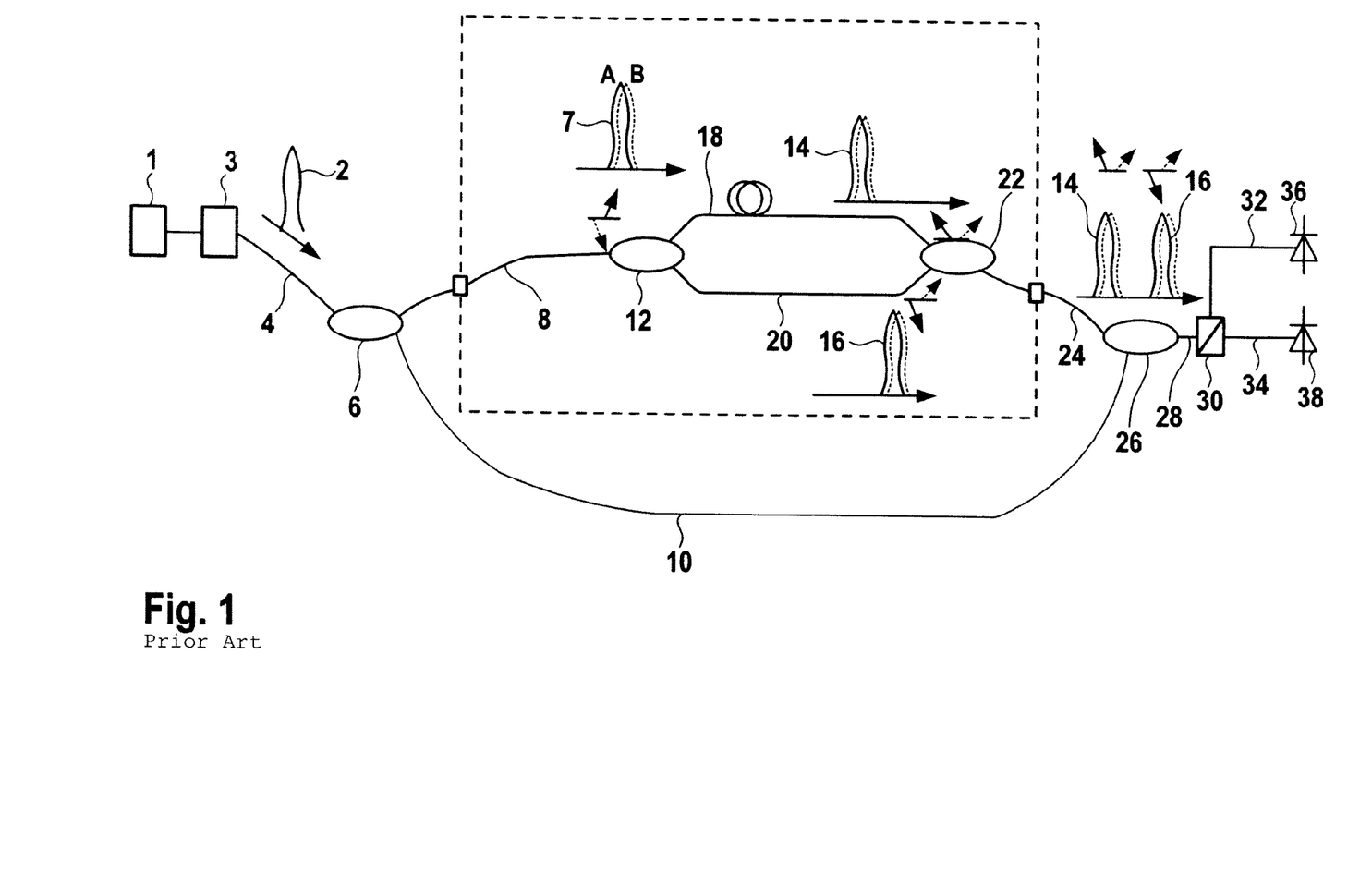
FIG. 1 shows a schematic illustration of an interferometric measurement setup for measuring the transfer function for calculation of an impulse response of an exemplary DUT.

For a better understanding this drawback of the prior art is demonstrated with a measurement setup shown in FIG. 1. An optical signal 2 generated by a tunable laser (TLS) 1 and transmitted through a polarization controller 3 and a fiber 4 is split by a first beam splitter 6 into a measurement signal 7 propagating in an upper DUT-arm 8 and into a reference signal propagating in a reference arm 10. An exemplary DUT, symbolized by a box of dashed lines, consisting of a polarization maintaining (PM) fiber 8 transports the optical signal 2 and generates two signal peaks A and B delayed to each other in time domain by 2 ps which is symbolized by two curves A and B in FIG. 1.

This simplified DUT inhibits the properties birefringence and multipath transmission occurring in passive optical components for fiber telecommunication (interleaver, multiplexer). The measurement signal 7 is split by a second beam splitter 12 positioned in arm 8 into sub-signals 14 and 16 propagating in an upper sub-arm 18 and a lower sub-arm 20 of upper measurement arm 8. Sub-arm 18 and sub-arm 20 are each made of single mode fiber (SMF). In FIG. 1 small arrows at the curves 14 and 16 indicate the orientation of principal states of polarization (PSPs) of the sub-signals 14 and 16.

With a third beam splitter 22 sub-signals 14 and 16 are recombined to a resulting signal 24 with a substantial delay of about 30 ps between the two sub-signals 14 and 16 since lower sub-arm 20 is 6 mm shorter than upper sub-arm 18. Signal 24, i.e., sub-signals 14 and 16, and the reference signal of reference arm 10 are recombined by a fourth beam splitter 26 to an interferogram or interference signal 28. The interference signal 28 is split by a polarization beam splitter (PBS) 30 into two signals 32 and 34. Signal 32 is detected by a detector 36 and signal 34 is detected by detector 38. The PBS 30 together with the two detectors 36 and 38 represents a polarization diversity receiver (PDR). Both PDR arms 36 and 38 are connected to an evaluation unit (not shown) to analyze the interferogram and generate a Fourier spectrum of the interferogram.

Figure 2:
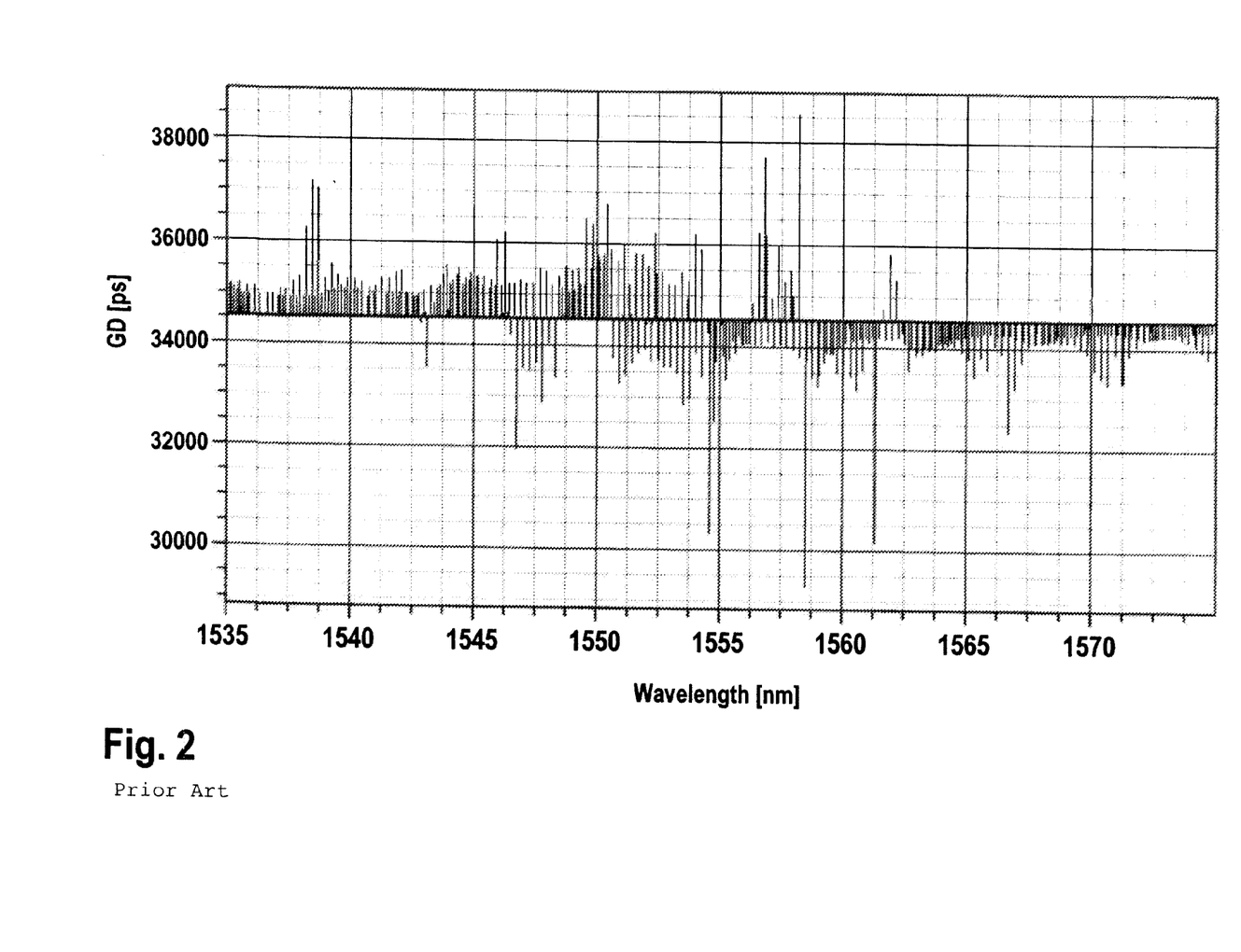
FIG. 2 shows the computation of the GD of the exemplary DUT of FIG. 1 for evaluating the transfer function according of the prior art method.
Figure 3:
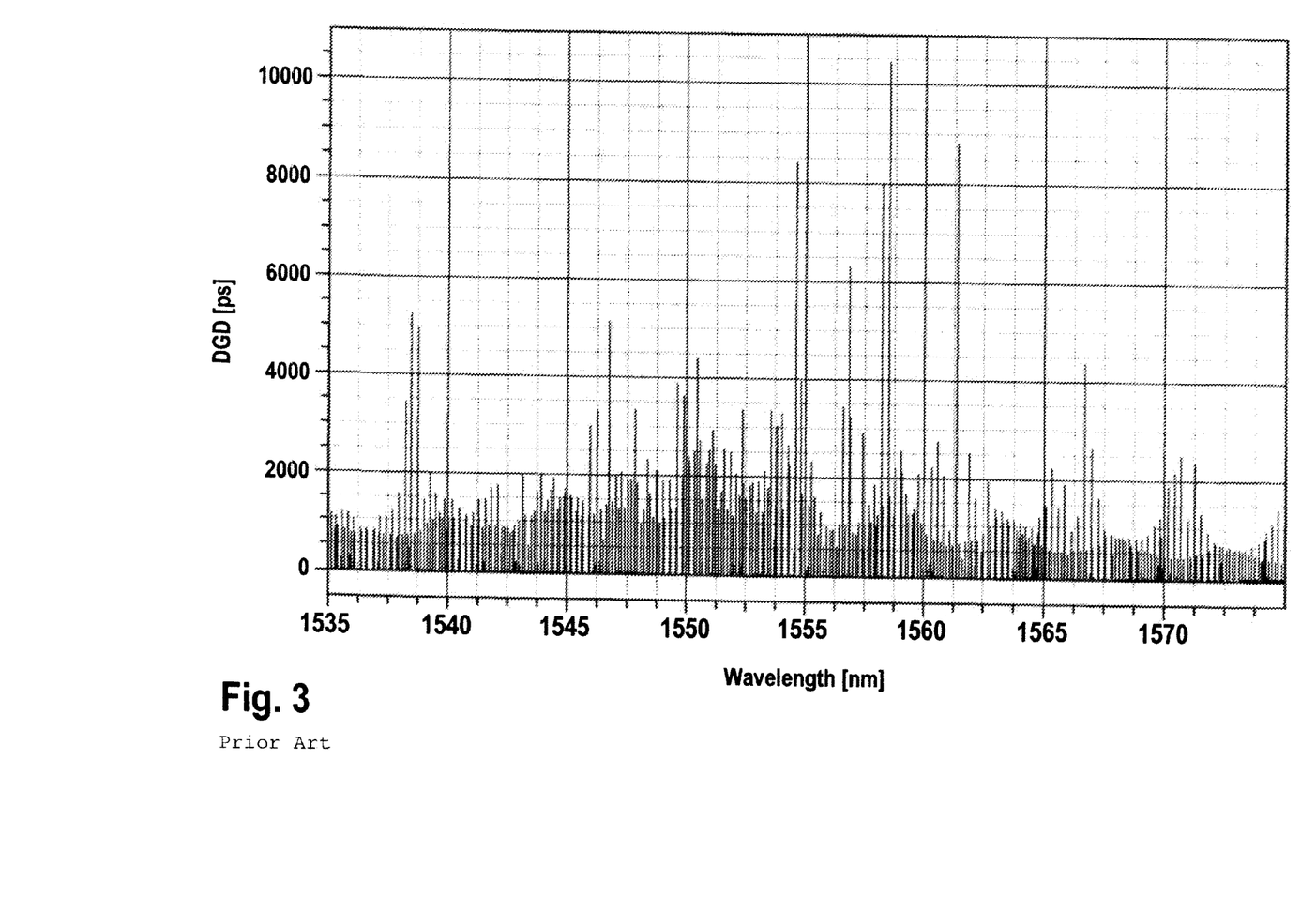
FIG. 3 shows the DGD of the exemplary DUT of FIG. 1 for evaluating the transfer function according of the prior art method.
Figure 4:
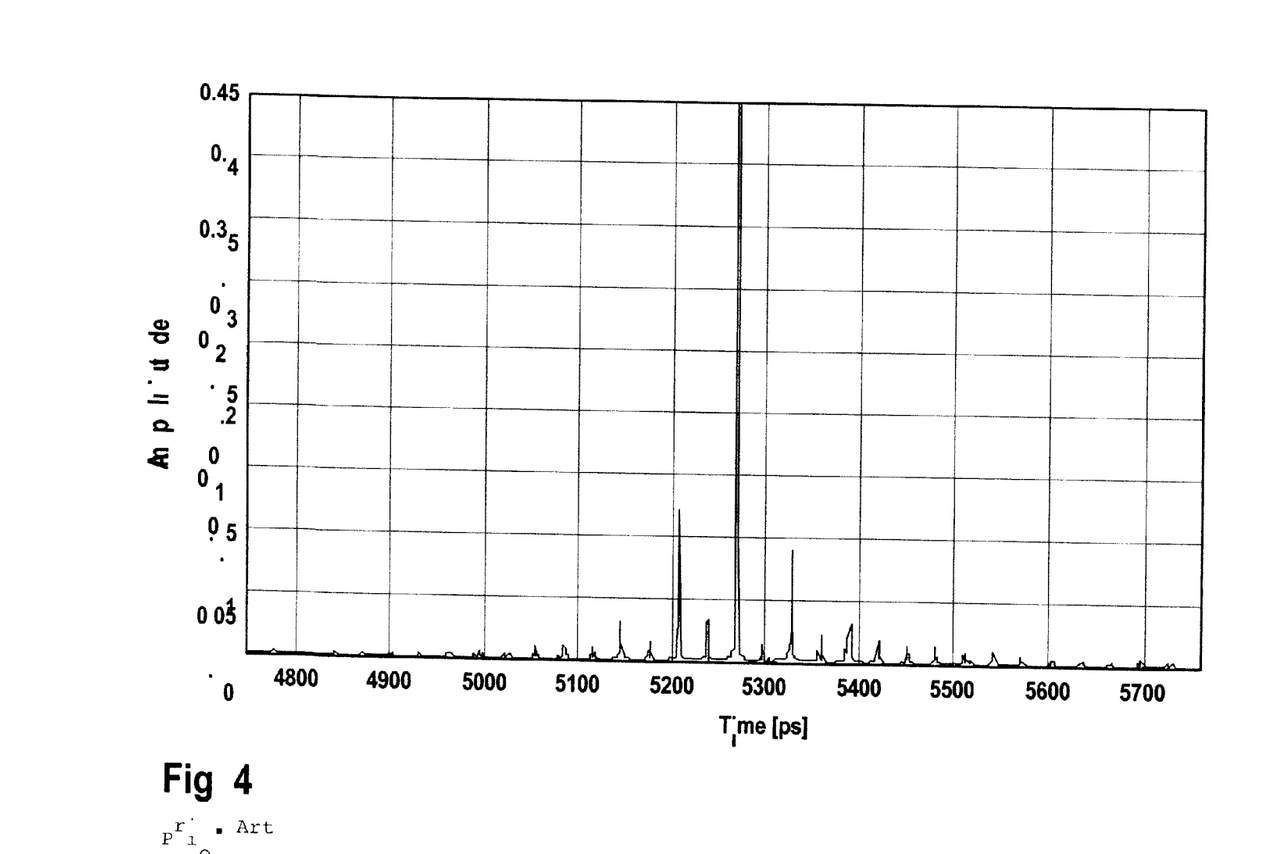
FIG. 4 shows the amplitudes of the impulse response calculation of the DUT of FIG. 1 based on the GD of FIG. 2 for evaluating the transfer function according of the prior art method.

In the Fourier spectrum two peak objects of comparable height will be observed. Additional interferences between these two peak objects will appear at lower frequencies and are here neglected (e.g. high pass filtered). Because the orthogonal PDRs 36 and 38 are not aligned with the individual PSPs of the two peak objects each PDR will see a rotated mixture. Therefore, the computation of group delay (GD), differential group delay (DGD) and amplitude eigenvalues by the evaluation unit yields artifacts that do not allow to extract correct impulse responses from the transfer functions. These artifacts are shown in FIGS. 2-4. FIG. 2 shows the GD, FIG. 3 shows the DGD and FIG. 4 shows the amplitudes of the impulse response calculation based on the GD of FIG. 2. In FIG. 4 instead of two main peaks separated due to the path difference between fiber 18 and 20 with a 2 ps split fine structure an artificial peak comb structure is generated. The structure shown in FIG. 4 is accidentally and may vary by slightly changing the positions and therefore the polarization states of the fibers used for the interferometric setup.

SUMMARY OF THE INVENTION

It is an object of the invention to provide improved interferometric determination of a transfer function of a DUT, and in particular to an improved interferometric determination of a transfer function of a DUT for calculating an impulse response of the DUT.

The object is solved by the independent claims. Preferred embodiments are shown by the dependent claims.

Embodiments of the present invention prevent the use of the above described Heffner algorithm based on an eigenstate calculation in optical frequency domain. Instead they suggest to perform the analysis in time domain, where the signals are clearly separated and the four polarization dependent impulse responses can be used directly.

Figure 9:
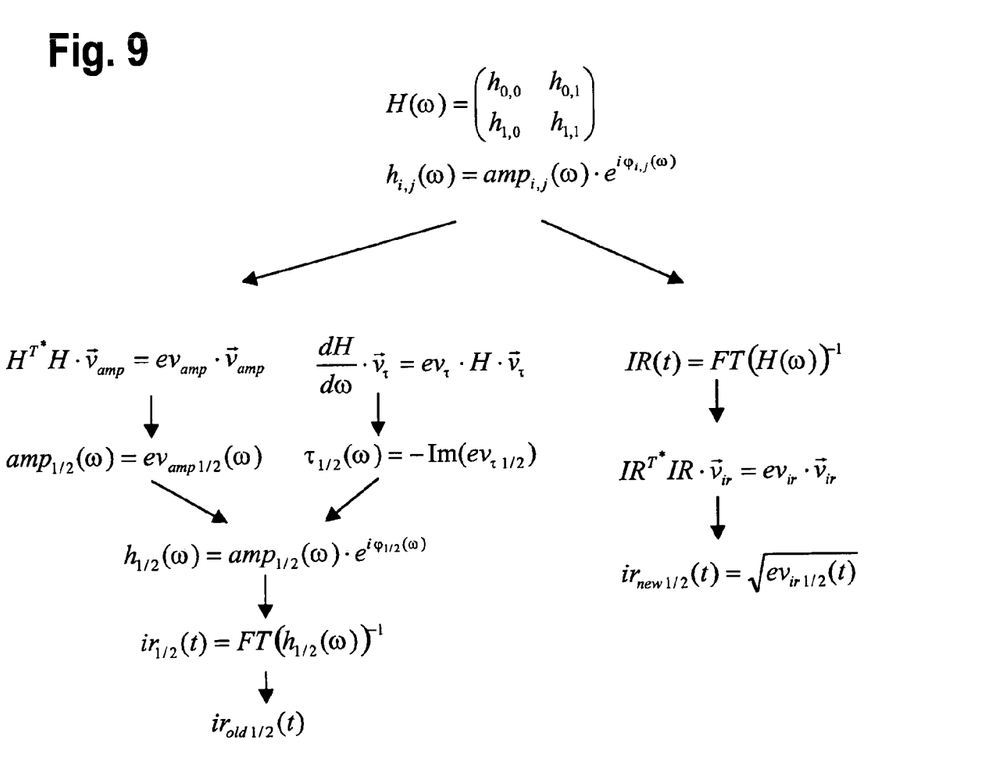

In FIG. 9 the evaluation way of the prior art as described above according to the Heffner algorithm with two eigenvalue problems is depicted on the left and an inventive way of the above embodiment is depicted on the right, both ways are based on the transfer function H, and both ways are opposed to each other, with $H(\omega)$ being the transfer function matrix (Jones matrix), $\omega$ being the optical frequency, $h_{i,j}(\omega)$ being the transfer functions, $amp_{i,j}$ being the amplitudes, $\phi_{i,j}$ being the phases, v being eigenvectors, ev being eigenvalues, $amp_{1/2}$ being the two amplitude eigenvalues 1 and 2, $\tau_{1/2}$ being the two GD eigenvalues 1 and 2, lm( ) being the imaginary part of a complex value, $\phi_{1/2}$ being the two phase eigenvalues 1 and 2 ($d\phi=\tau^*d\omega$), $h_{1/2}$ being the two eigenvalue transfer functions based on the amplitude and phase eigenvalues, FT( ) being a Fourier transformation, $ir_{1/2}$ being the two impulse responses based on the two eigenvalue transfer functions $h_{1/2}$, $ir_{old\ 1/2}$ being the two amplitudes of the impulse responses based on the old method of Heffner, IR being the impulse response matrix, $ir_{new\ 1/2}$ being the two impulse response amplitudes based on the new method and IR(t) being the impulse response matrix.

In the new and inventive way of the embodiment depicted on the right FIG. 9 the Fourier transform FT of the transfer function matrix $H(\omega)$ is already an impulse response matrix IR(t) of the measured DUT, with the only difference, that the carrier frequency is not the optical frequency of DUT but the synthetic heterodyne frequency of the used interferometer. But this has only impact on the phase slope, so that IR(t) $=FT(H(\omega))^{-1}$.

Figure 10A:
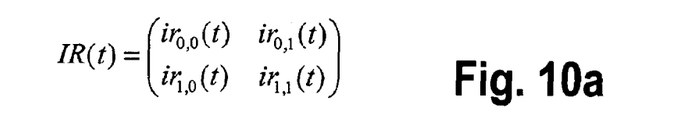

For example four polarization resolved measurement results consisting of two orthogonal detections 1 and 2 and with two orthogonal input polarizations 1 and 2 can be interpreted as an impulse response matrix IR(t) according to FIG. 10a.

Figure 10B:
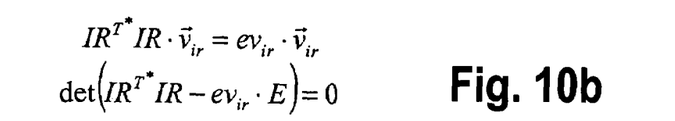

To extract the real, non-negative envelope eigenvalues of the complex impulse response the eigenvalue problem with the matrix product $IR^{T^*}$ IR has to be solved according to FIG. 10b with the envelope eigenvalues $ev_{ir}$ and the eigenvectors $v_{ir}$.

Figure 10C:
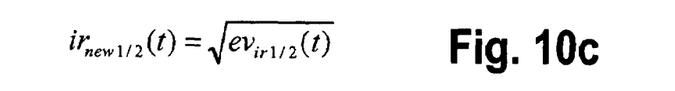

Then, the real non-negative polarization resolved impulse response amplitude eigenvalues $ir_{new\ 1/2}(t)$ are then calculated according to FIG. 10c.

Because this eigenvalue calculation is performed in time domain, where the impulse responses of different path lengths are separated, the eigenvalue operation in time domain is also separated and the different reflection or transmission objects of a DUT do not interfere in the computation.

A polarization rotation due to different fiber propagation and due to arbitrariness of the orientation of the PSPs does not matter, because the eigenvalue computation of transmission (or reflection) objects is individually.

According to preferred embodiments of the present invention allow the polarization resolved determination of multiple impulse responses in transmission and in reflection, regardless of peak heights, polarization orientation, and number of objects. A complete chain of impulses can be calculated in one step and fine structure delays caused by DGD can be resolved. This is of special interest for polarization resolved reflectometry and parallel transmission line devices.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention.

Features that are substantially or functionally equal or similar will be referred to with the same reference sign(s).

DETAILED DESCRIPTION OF PREFERRED EMBODIMENTS OF THE INVENTION

FIG. 1-4 were already described above.

Figure 5:
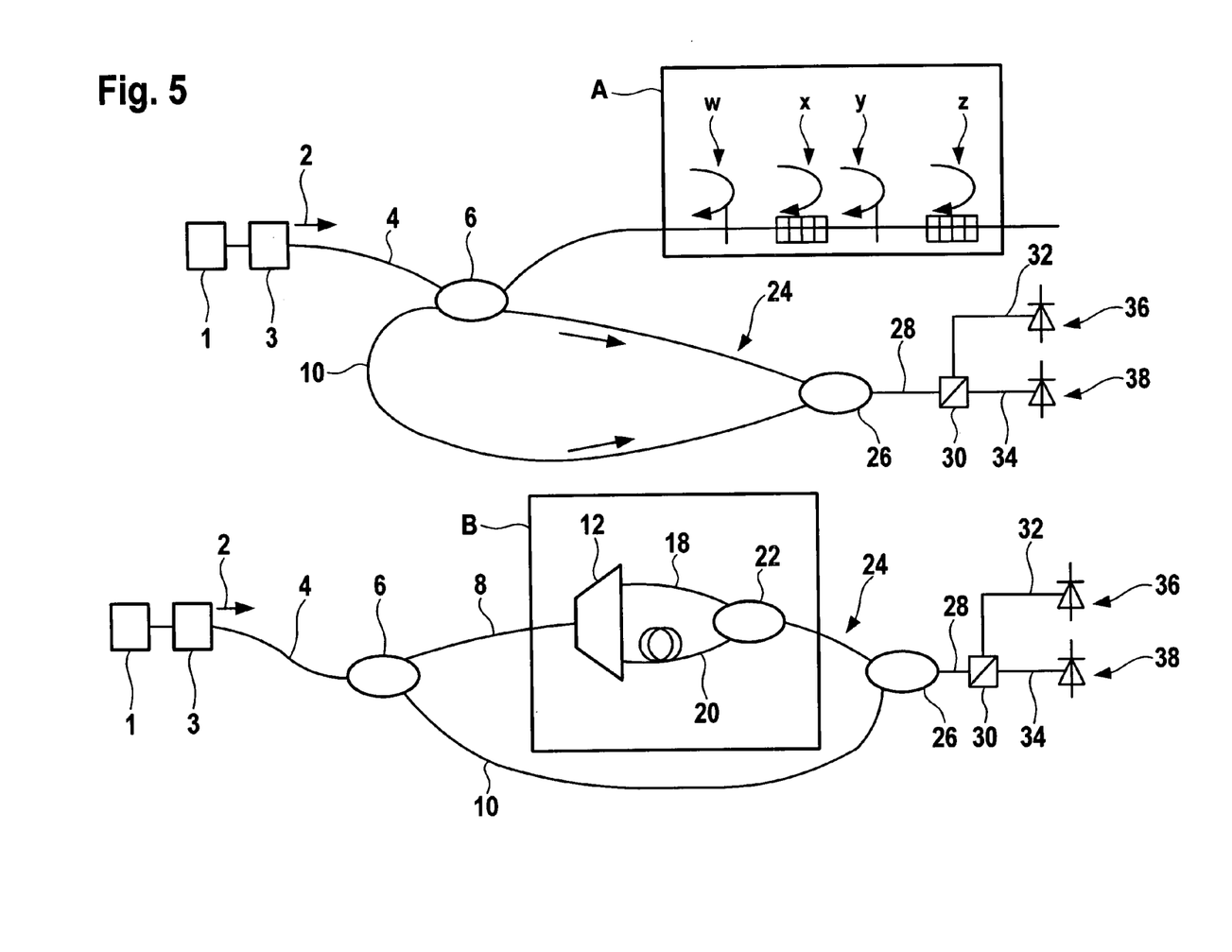
FIG. 5 shows examples of scenarios of an interferometric determination setup for measuring the interferometric transfer function of a DUT in reflection (above) and in transmission (below) in which multiple impulse responses occur because of multiple transfer function elements of the DUT(s)

Referring now in greater detail to the drawings, FIG. 5 shows two examples of scenarios of an interferomethic measurement setup. The above setup is an example for measuring the interferometric transfer function of a DUT A in reflection in which multiple impulse responses occur because of multiple reflective transfer function elements w, x, y and z of DUT A (e.g. an optical add/drop multiplexer (OADM) consisting of a chain of fiber bragg gratings (FBG)). The below setup is an example for measuring the interferometric transfer function of a DUT B in transmission in which multiple impulse responses occur because of multiple transmitting transfer function elements 18 and 20 of DUT B (e.g. an arrayed wave guide (AWG) or interleaver).

This embodiment works as follows:

The two initial polarization states and the two detectors 36 and 38 yield four interferograms $P_{i,j}(\omega)$, with the indices $i,j \in \{0,1\}$, $\omega$ being the frequency of the optical signal, $E_{LO}$ specifying the local oscillator and $E_{dut\ i,j}$ specifying the e-field amplitude that passed the DUT. Interferogram $P_{i,j}(\omega)$ can be described by the formula of FIG. 11a.

Figure 11A:
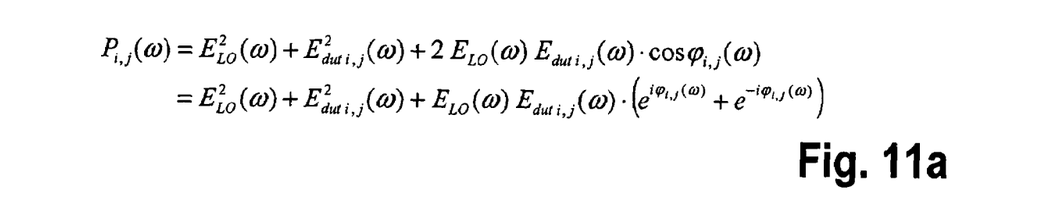
Figure 11B:
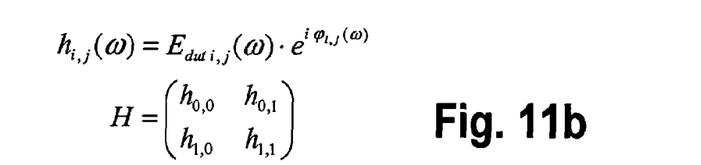

Eliminating the offset and low frequency parts, assuming $E_{LO}(\omega)=1=$const. and omitting the last term in the brackets of the equation of FIG. 11a yields the transfer functions $h_{i,j}(\omega)$ to be according to FIG. 11b.

For the transfer functions $h_{i,j}(\omega)$ of FIG. 11b the detected interferograms $P_{i,j}(\omega)$ and amplitudes $E_{dut\ i,j}$ and phases $\phi_{i,j}$ can be evaluated by applying a Hilbert transformation to the interferograms $P_{i,j}(\omega)$ to get the transfer functions $h_{i,j}(\omega)$.

The Fourier transformation FT of the transfer function matrix H(ω) is already the impulse response matrix IR(t) of the measured DUT, with the only difference, that the carrier frequency is not the optical frequency of DUT but the synthetic heterodyne frequency of the interferometer. But this has only impact on the phase slope, so that IR(t)=FT (H(ω))$^{-1}$.

Four polarization resolved measurement results consisting of two orthogonal detections 1 and 2 at detectors 36 and 38 and input polarizations 1 and 2 (sweep 1 and 2) can be interpreted as an impulse response matrix IR(t) according to FIG. 10a.

Figure 6:
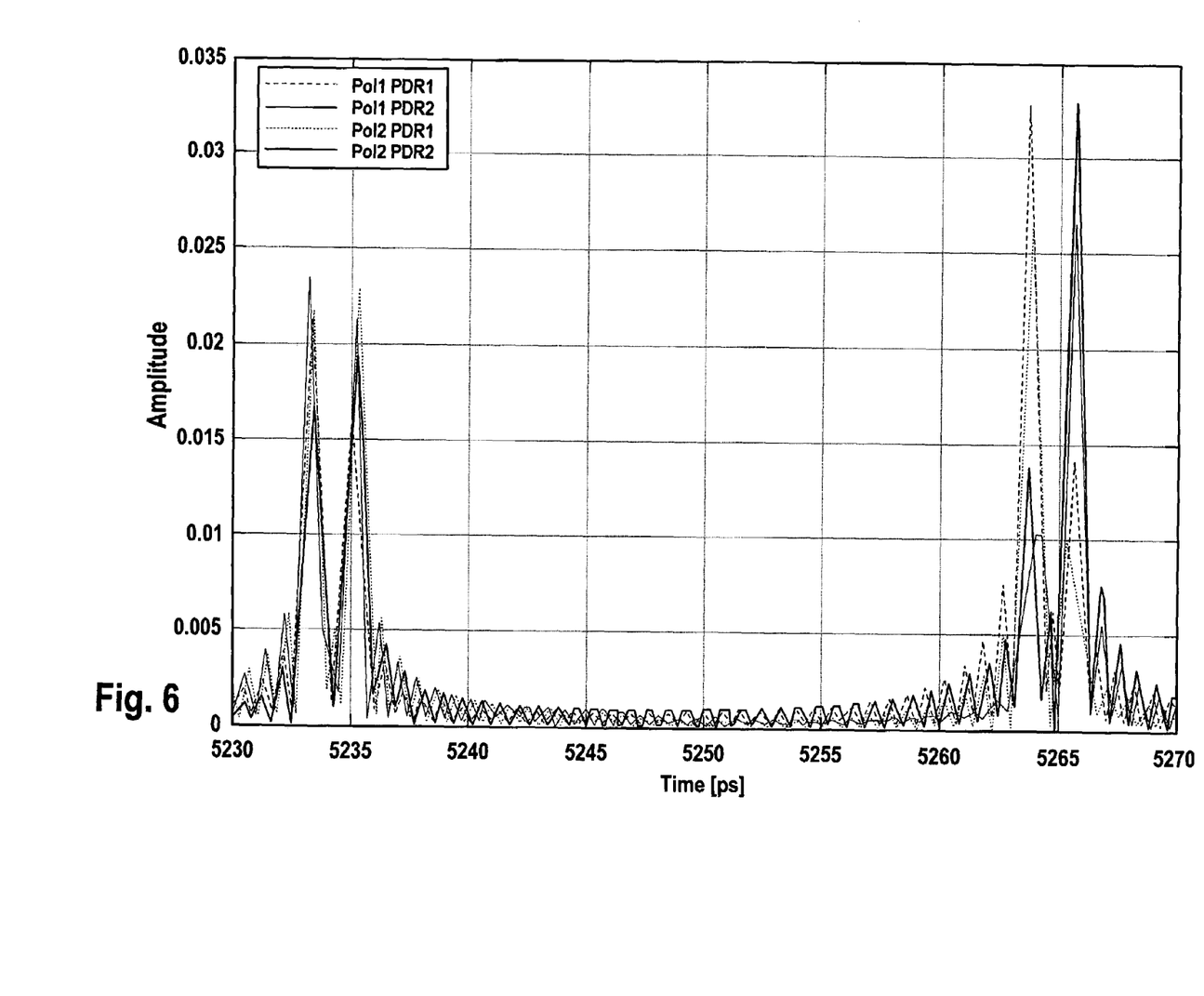
FIG. 6 shows the amplitudes of the impulse response calculation of the exemplary DUT of the setup of FIG. 5 based on evaluating the transfer function according to an embodiment of the present invention without selectivity for the PSPs.

These values of IR(t) are depicted in FIG. 6. In FIG. 6 the four amplitudes Pol1 PDR1, Pol1 PDR2, Pol2 PDR1 and Pol2 PDR2 of the two impulse response objects 18 and 20 of DUT B of the measurement example at the bottom of FIG. 5 can be clearly identified. One can also see, that due to different polarization rotations Pol1 and Pol2 in the two sub-arms 18 and 20 the polarization resolved detection at PDR 36 and at PDR 38 is different for the two objects 18 and 20.

To extract the real, non-negative amplitude eigenvalues $ir_{new\ 1/2}$ of the complex impulse response matrix IR(t) the eigenvalue problem with the matrix product $IR^{T*}$ IR has to be solved according to FIG. 10b with the envelope eigenvalues $ev_{ir}$ and the eigenvectors $v_{ir}$.

The polarization resolved impulse response eigenvalues $ir_{new\ 1/2}(t)$ are then calculated according to FIG. 10c.

Figure 7:
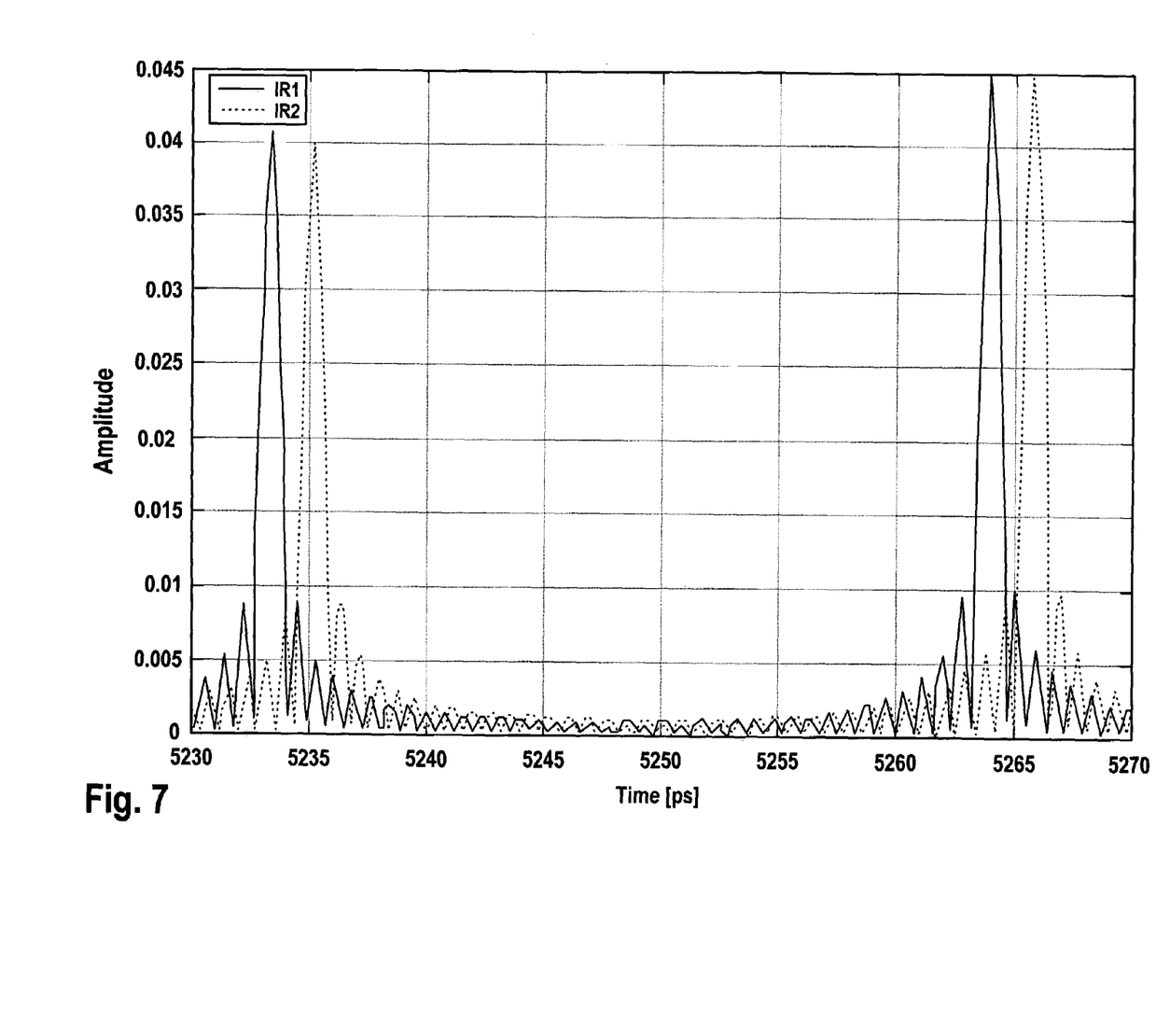
FIG. 7 shows the amplitudes of the impulse response calculation of the exemplary DUT of the setup of FIG. 5 based on solving the eigenvalue problem for the impulse response matrix according to an embodiment of the present invention with additional selectivity for the PSPs.

These values of $ir_{new\ 1/2}(t)$ are depicted in FIG. 7. According to FIG. 7 solving the eigenvalue problem in time domain unveils the same eigenvalue fine structure for the two impulse response objects 18 and 20 as expected, i.e., according to FIG. 7 solving the eigenvalue equation yields two identical impulse responses IR1 and IR2 with the same polarization fine structure representing the PMF delay of PMF 8.

Because the eigenvalue calculation is performed in time domain, where the impulse responses IR of different path lengths 18 and 20 are separated, the eigenvalue operation in time domain is also separated and the different transmission objects 18 and 20 of DUT B (or the different reflective objects w, x, y and z of DUT A) do not interfere in the computation of this embodiment.

The invention claimed is:

1. A method of evaluating a device under test (DUT), comprising:
   detecting four interferograms of the DUT including two orthogonal detections and two orthogonal input polarizations
   performing a Hilbert transformation to obtain transfer functions of the DUT on the basis of the detected interferograms,
   performing an Inverse Fourier transformation on the transfer functions of the DUT to get an impulse response matrix IR of the DUT, and
   determining impulse response eigenvalues of the DUT on the basis of the impulse response matrix of the DUT.

2. The method of claim 1, further comprising: determining impulse response amplitude eigenvalues of the impulse response matrix by solving an eigenvalue problem in time domain with a matrix product according to the following scheme:

$$IR^{T*}IR \cdot \vec{v}_{ir} = ev_{ir} \cdot \vec{v}_{ir}$$
$$\det(IR^{T*}IR - ev_{ir} \cdot E) = 0$$

with envelope eigenvalues $ev_{ir}$ and the eigenvectors $\vec{v}_{ir}$.

3. A software program or product, encoded on a computer readable medium, with instructions for executing the method of claim 1 when run on a data processing system.

4. An apparatus for evaluating a device under test (DUT), comprising:
   an interferometer for detecting four interferograms of the DUT including two orthogonal detections and two orthogonal input polarizations, and
   an evaluation unit for performing a Hilbert transformation to obtain transfer functions of the DUT on the basis of the detected interferograms, and for performing an Inverse Fourier transformation on the transfer functions of the DUT to get an impulse response matrix IR of the DUT, and for determining impulse response eigenvalues of the DUT on the basis of the impulse response matrix of the DUT.

5. The apparatus of claim 4,
   wherein the evaluation unit determines impulse response amplitude eigenvalues of the impulse response matrix by solving an eigenvalue problem in time domain with a matrix product according to the following scheme:

$$IR^{T*}IR \cdot \vec{v}_{ir} = ev_{ir} \cdot \vec{v}_{ir}$$
$$\det(IR^{T*}IR - ev_{ir} \cdot E) = 0$$

with envelope eigenvalues $ev_{ir}$ and the eigenvectors $\vec{v}_{ir}$.

* * * * *